US009806900B2

(12) United States Patent
Jacobson et al.

(10) Patent No.: US 9,806,900 B2
(45) Date of Patent: Oct. 31, 2017

(54) WIRELESS PROVISIONING AND CONFIGURING OF HARDWARE ELEMENTS OF A HOME AUTOMATION SYSTEM

(71) Applicant: Savant Systems, LLC, Hyannis, MA (US)

(72) Inventors: Arthur A. Jacobson, Centerville, MA (US); David W. Tatzel, West Yarmouth, MA (US); Michael C. Silva, East Sandwich, MA (US); Adam J. Moore, San Francisco, CA (US); Jaireh Tecarro, Berkeley, CA (US); Gregory T. Shirai, Oakland, CA (US)

(73) Assignee: Savant Systems, LLC, Hyannis, MA (US)

( * ) Notice: Subject to any disclaimer, the term of this patent is extended or adjusted under 35 U.S.C. 154(b) by 127 days.

(21) Appl. No.: 14/875,254

(22) Filed: Oct. 5, 2015

(65) Prior Publication Data

US 2017/0099157 A1    Apr. 6, 2017

(51) Int. Cl.
*H04L 12/28* (2006.01)
*H04W 8/00* (2009.01)
(Continued)

(52) U.S. Cl.
CPC ......... *H04L 12/2814* (2013.01); *H04W 4/001* (2013.01); *H04W 8/005* (2013.01);
(Continued)

(58) Field of Classification Search
None
See application file for complete search history.

(56) References Cited

U.S. PATENT DOCUMENTS 7,769,837 B2    8/2010  Nogawa et al.
8,244,223 B2    8/2012  Farah
(Continued)

FOREIGN PATENT DOCUMENTS

EP    2611079 A1    7/2013

OTHER PUBLICATIONS

U.S. Appl. No. 14/875,399, filed Oct. 5, 2015 by Bharat Welingkar et al. for Cloud-Synchronized Architecture for a Home Automation System, pp. 1-32.
(Continued)

*Primary Examiner* — Eunsook Choi
(74) *Attorney, Agent, or Firm* — Cesari and McKenna, LLP; James A. Blanchette

(57) ABSTRACT

In various embodiments, techniques are provided for utilizing a WPAN (e.g., BLE) and an in-home LAN (e.g., Wi-Fi network) together to provision and/or configure hardware elements of a home automation system. In one embodiment, a first WPAN-discoverable hardware element (e.g., a host controller) of the home automation system advertises its presence on a WPAN. The first WPAN-discoverable hardware element receives user-provided network credentials from a mobile app, which are used to configure the first WPAN-discoverable hardware element on the in-home LAN, and which are stored in a storage device of the first WPAN-discoverable hardware element. To provision a second WPAN-discoverable hardware element (e.g., a device) of the home automation system on the in-home LAN, the first WPAN-discoverable hardware element transfers the network credentials back to the mobile app via the in-home LAN, and causes the mobile app to forward the network credentials via the WPAN to the second hardware element.

30 Claims, 13 Drawing Sheets

(51) Int. Cl.
*H04W 4/00* (2009.01)
*H04W 84/18* (2009.01)
(52) U.S. Cl.
CPC ......... *H04L 12/2803* (2013.01); *H04W 4/008* (2013.01); *H04W 84/18* (2013.01)

(56) References Cited

U.S. PATENT DOCUMENTS

| | | | |
|---|---|---|---|
| 8,549,658 B2 | 10/2013 | Kolavennu et al. | |
| 8,862,096 B1 | 10/2014 | Viswanathan et al. | |
| 8,892,037 B2* | 11/2014 | Auriffeille | G06Q 10/10 455/41.1 |
| 9,014,633 B2* | 4/2015 | Tse | H04W 4/008 370/217 |
| 9,054,961 B1* | 6/2015 | Kim | H04L 41/0806 |
| 9,124,999 B2* | 9/2015 | Junk | G05B 19/4186 |
| 9,153,125 B2 | 10/2015 | Madonna et al. | |
| 9,578,511 B2* | 2/2017 | Kashef | H04L 63/08 |
| 2007/0143801 A1 | 6/2007 | Madonna et al. | |
| 2013/0024685 A1* | 1/2013 | Kolavennu | H04L 41/0806 713/153 |
| 2013/0026947 A1 | 1/2013 | Economy et al. | |
| 2013/0086232 A1 | 4/2013 | Hwang et al. | |
| 2013/0283025 A1 | 10/2013 | Madonna et al. | |
| 2014/0376528 A1* | 12/2014 | Madonna | H05B 37/0272 370/338 |
| 2015/0002276 A1 | 1/2015 | Kicklighter et al. | |
| 2015/0081104 A1 | 3/2015 | Madonna et al. | |
| 2015/0341184 A1 | 11/2015 | Tatzel et al. | |
| 2015/0382198 A1* | 12/2015 | Kashef | H04L 63/08 726/5 |
| 2016/0192277 A1* | 6/2016 | Starsinic | H04L 63/105 370/329 |
| 2017/0013069 A1* | 1/2017 | Grohman | H04L 67/22 |

OTHER PUBLICATIONS

Bigioi, Petronel, et al., "Transparent, Dynamically Configurable RF Network Suitable for Home Automation Applications," IEEE Transactions on Consumer Electronics, vol. 45, No. 3, Aug. 1999, pp. 474-480.

"Notification of Transmittal of the International Search Report and the Written Opinion of the International Searching Authority, or the Declaration," International Filing Date: Oct. 4, 2016, International Application No. PCT/US2016/055302, Applicant: Savant Systems, LLC, dated Jan. 16, 2017, pp. 1-14.

* cited by examiner

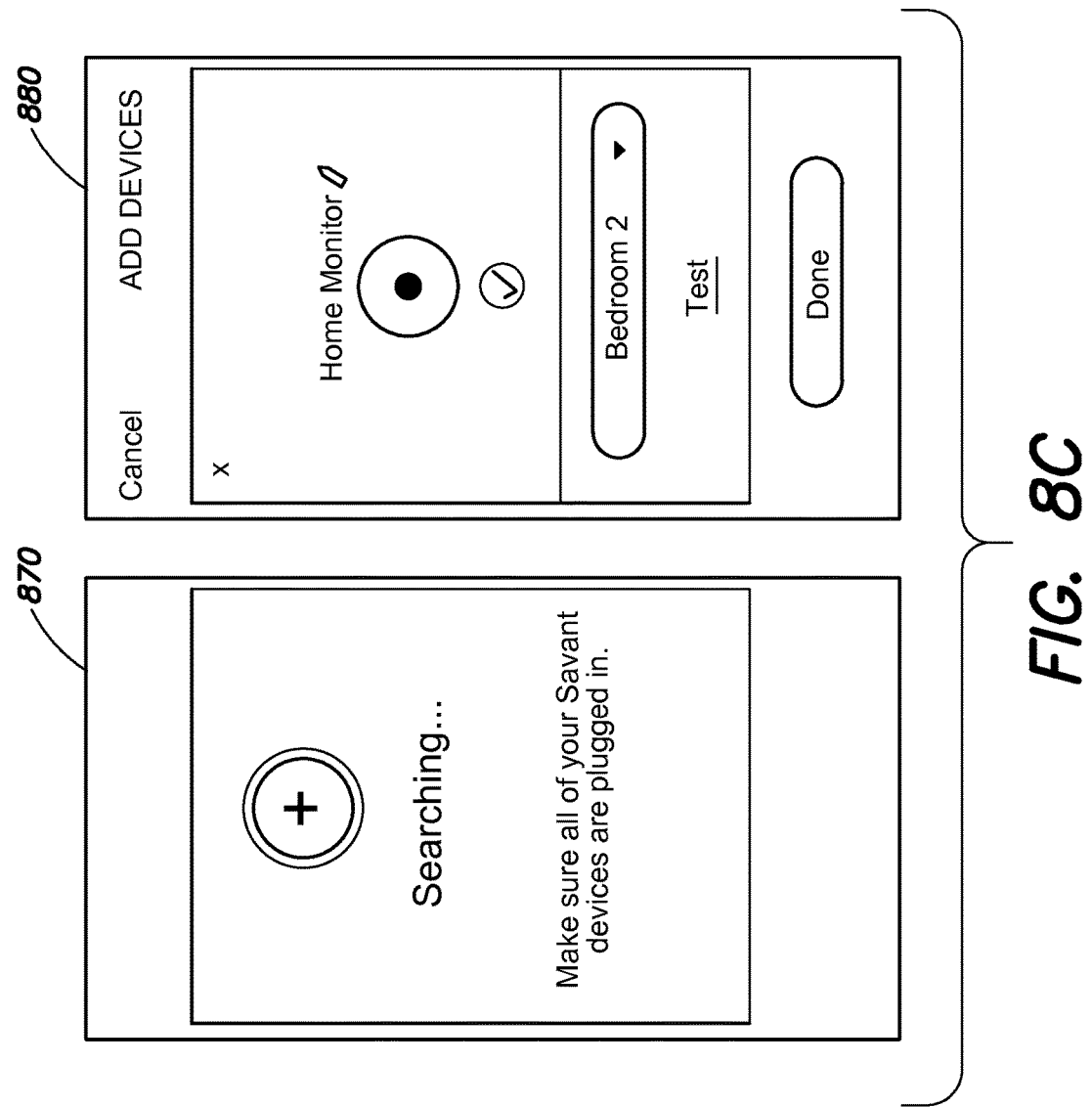

WIRELESS PROVISIONING AND CONFIGURING OF HARDWARE ELEMENTS OF A HOME AUTOMATION SYSTEM

BACKGROUND

Technical Field

The present disclosure relates generally to home automation systems and more specifically to provisioning and onboarding hardware elements of a home automation system.

Background Information

Home automation systems are becoming increasingly popular in both residential and commercial buildings. Such systems may include one or more in-home controllers that are capable of controlling, switching data between, and otherwise interacting with a wide variety of devices, including lighting devices, security devices, audio/video (A/V) devices, heating ventilation and cooling (HVAC) devices, electronic door locks, and/or other types of devices. Traditionally, many home automation systems have required an involved installation procedure to make the system functional. Further, involved update procedures have been required each time a change is made to the system. Such installation and update procedures often have required the services of a skilled home automation system installer to handle the various complexities involved.

One complexity is "provisioning" devices of the home automation system with network credentials to allow them to communicate with each other on a network. To provision devices, an installer has typically been required to take individual actions on each and every device of the home automation system. For devices that have their own a user interface (e.g., have a screen and input device), the installer generally would manually enter the network credentials into the device. When no user interface was available on certain devices, but a connection port (e.g., a universal serial bus (USB), RS232 port, etc.) was provided, the installer would often temporarily couple another device (e.g., a laptop or tablet computer running special-purpose software) to each such device via a cable, and transfer the network credentials over the cable connection. For still other devices, the installer would perform physical actions on them to cause them to acquire network credentials, for example, pressing pairing buttons, manipulating switches, etc.

Such existing provisioning procedures are time consuming and error prone. When there are a large number of devices in a home automation system, repeatedly entering the same network credentials may take considerable time. If an error (e.g., a typo) is made, devices may be unable to communicate with each other until the problem is diagnosed.

Another complexity is configuring a home automation system to utilize new devices. While a new device, once provisioned, may be able to communicate with other devices on a network, typically some configuration information is required in order for the home automation system to make use of the new device in providing services. Traditionally, such configuration information has been provided by an installer using a high-level (i.e. "architects view") design tool (e.g., the RacePoint Blueprint™ design tool available from Savant Systems Inc.) Using the design tool, the installer would build a detailed system configuration of the home automation system, configuring each device and defining interconnections between them. Once the system configuration was complete, the installer would compile the system configuration into an executable form that could be run to provide services.

Such existing configuration procedures typically are complex and time consuming. An in-depth understanding of home automation system architectures and design principles may be required, rendering the procedures unsuited for homeowners or lower-skill level, general purpose installers. Accordingly, with existing configuration procedures the services of a skilled home automation system installer may be required.

There is a need for new techniques for provisioning and configuring devices as part of an initial installation or update to a home automation system that may simplify tasks, and make them more accessible to homeowners and general-purpose installers. Such techniques, if available, could allow home automation to be utilized by a wider audience, who may be unable or unwilling to pay a skilled home automation system installer to initially setup and later update their system.

SUMMARY

Example techniques are provided for wireless provisioning and onboarding of a host controller and devices (collectively, hardware elements) of a home automation system, that may streamline procedures to make these tasks accessible to homeowners and general-purpose installers. Such techniques may use a wireless personal area network (WPAN) (e.g., Bluetooth low energy (BLE)) together with an in-home LAN (e.g., Wi-Fi network), and leverage the capabilities of a mobile application (app) executing on a mobile device.

In one example embodiment, a first WPAN-discoverable (e.g., Bluetooth-discoverable) hardware element of a home automation system (e.g., a host controller) advertises its presence on a WPAN (e.g., BLE). A mobile app scans on the WPAN to discover the first WPAN-discoverable hardware element. The first WPAN-discoverable hardware element receives user provided network credentials (e.g., Service Set Identifier (SSID) and password) over the WPAN from the mobile app, and configures its network adaptor for an in-home LAN (e.g., Wi-Fi network). In this manner, the mobile app provisions the first WPAN-discoverable hardware element over the WPAN. The first WPAN-discoverable hardware element also stores the network credentials in a local storage device for later use. When needed, the first WPAN-discoverable hardware element provisions a second WPAN-discoverable (e.g., Bluetooth-discoverable) hardware element of the home automation system (e.g., a device) by transferring the network credentials back to the mobile app via the in-home LAN, and causing the mobile app to forward the network credentials via a WPAN (e.g., BLE) to the second hardware element.

In a second example embodiment, a first WPAN-discoverable (e.g., Bluetooth-discoverable) hardware element of the home automation system (e.g., a host controller) scans on a WPAN (e.g., BLE) to discover a second WPAN-discoverable (e.g., Bluetooth-discoverable) hardware element of the home automation system (e.g., a device) that is not accessible on an in-home LAN (e.g., Wi-Fi network). The first WPAN-discoverable hardware element retrieves network credentials (e.g., SSID and password) for the in-home LAN from a local storage device. The first WPAN-discoverable hardware element provisions the second WPAN-discoverable hardware element by transferring the network credentials to the second WPAN-discoverable hardware element over the WPAN.

In a third example embodiment, a second WPAN-discoverable (e.g., Bluetooth-discoverable) hardware element of the home automation system (e.g., a device) scans on a WPAN (e.g., BLE) to discover a third WPAN-discoverable (e.g., Bluetooth-discoverable) hardware element of the home automation system (e.g., another device) that is not accessible on an in-home LAN (e.g., Wi-Fi network). The second WPAN-discoverable hardware element retrieves network credentials (e.g., SSID and password) for the in-home LAN over the in-home LAN from a first WPAN-discoverable (e.g., Bluetooth-discoverable) hardware element of the home automation system (e.g., a host controller) that maintains the credentials in a local storage device. The second WPAN-discoverable hardware element provisions the third WPAN-discoverable hardware element by transferring the network credentials to the third WPAN-discoverable hardware element over a WPAN (e.g., BLE).

In a fourth example embodiment, a mobile app scans on a WPAN (e.g., BLE) to discover a second WPAN-discoverable (e.g., Bluetooth-discoverable) hardware element of a home automation system (e.g., a device) that is not accessible on an in-home LAN (e.g., Wi-Fi network). The mobile app retrieves network credentials (e.g., SSID and password) for the in-home LAN over the in-home LAN from a first WPAN-discoverable (e.g., Bluetooth-discoverable) hardware element of the home automation system (e.g., a host controller) that maintains the credentials in a local storage device. The mobile app provisions the second WPAN-discoverable hardware element by transferring the network credentials to the second WPAN-discoverable hardware element over a WPAN (e.g., BLE).

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which:

FIGS. 8A-8C are a series of example screen shots of a provisioning and configuration UI of a mobile app that may be shown on a display screen of a mobile device.

DETAILED DESCRIPTION

Definitions

As used herein, the term "home automation system" should be interpreted broadly to encompass various types of home control, "smart home", and/or device control systems that may control devices (e.g., lighting devices, security devices, A/V devices, HVAC devices, electronic door locks, and/or other types of devices) within a structure, such as a residential dwelling or commercial building. A home automation system may control a variety of different types of devices, or devices of only a particular type (e.g., only lighting devices, only A/V devices, etc.).

As used herein, the term "mobile device" refers to an electronic device that executes a general-purpose operating system and is adapted to be transported on one's person. Devices such as smartphones and tablet computers should be considered mobile devices. Desktop computers, servers, or other primarily-stationary computing devices generally should not be considered mobile devices.

As used herein, the term "hardware element" refers to a physical hardware unit that may be a part of a larger system, such as a home automation system. Hardware elements of a home automation system may include a host controller of the home automation system and devices of the home automation system, such as lighting devices, A/V devices, security devices, HVAC devices, electronic door locks, or other types of devices controlled by a host controller of the home automation system, or a remote control used to control the host controller.

As used herein, the term "provisioning" refers to providing a hardware element with network credentials that enable the hardware element to join a LAN. The network credential may vary based on a type of the LAN. For example, where the LAN is a Wi-Fi network, the network credentials may include an SSID and password.

As used herein, the term "onboarding" refers to providing configuration information related to a hardware element that enables the hardware element to be used in providing one or more services in a home automation system. The configuration information may include a room in which the hardware element is located, connections between the hardware element and other hardware elements, as well as other types of information.

As use herein, the term "service" refers to an activity offered by a home automation system that involves interactions between one or more hardware elements of the home automation system. A service may, but need not, define a list of commands and state feedback applicable to the activity.

An Example Home Automation System

Figure 1:
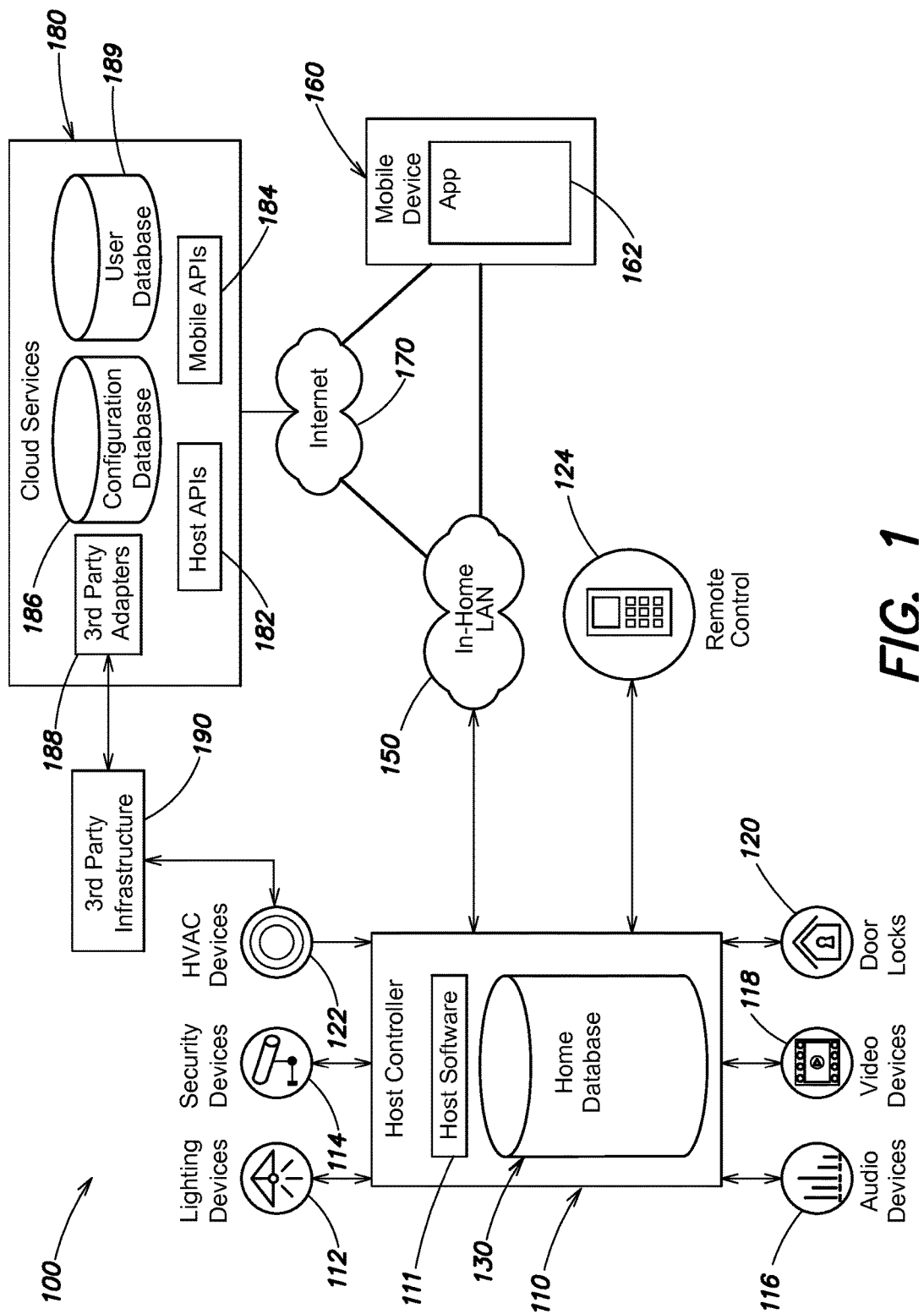
FIG. 1 is a block diagram of an example architecture of a home automation system operable to control devices about a structure.

FIG. 1 is a block diagram of an example architecture 100 of a home automation system operable to control devices about a structure (e.g., a residential dwelling or commercial building). At the core of the system is a host controller 110 coupled to an in-home local area network (LAN) 150 (e.g., a Wi-Fi network). The host controller 110 may include hardware components such as a processor, a memory, a storage device, a LAN interface (e.g., Wi-Fi interface), and a WPAN interface (e.g., BLE interface), as well as other hardware components. The storage device may store host software 111 that when executed may implement parts of the below described provisioning and configuration techniques, as well as monitor and control the operations of devices 112-122, interface with and provide user interface (UI) interpretation for a remote control 124, provide system administration and monitoring, synchronization with cloud services 180 and a mobile device 160, provide activity recording and profile management, and perform other functions. The storage device of the host controller 110 may maintain a secure store of network credentials (e.g., SSID and password) for the in-home LAN 150, as well as maintain a home database 130.

The devices 112-122 of the home automation system may include lighting devices 112, such as lighting controllers, lamp modules, dimmer modules, switches, keypads, fan controllers and the like; security devices 114, such as cameras/home monitors, motion sensors, home healthcare sensors, related controllers and the like; audio devices 116 and video devices 118 (collectively A/V devices), such as A/V device controllers, infrared (IR) blasters, matrix switchers, media servers, audio amplifiers, cable boxes, and the like; electronic door locks 120 and other types of motor or relay operated devices; HVAC devices 122, such as thermostats; as well as other types of devices. Further a remote control 124 may be provided. The remote control may provide a home automation control UI in which a user can provide input to trigger the host controller 110 to issue control commands to device 112-122. For purposes of the below discussion, the remote control 124 may be considered a device.

Depending on the implementation, the communications capabilities of the devices 112-124 of the home automation system may vary. For example, at least some of the devices may include both a LAN interface (e.g., a Wi-Fi interface) and a WPAN interface (e.g., a BLE interface) to enable them to communicate with the host controller 110 and other devices via the in-home LAN 150 or WPANs. Likewise, some of the devices may include only a LAN interface (e.g., a Wi-Fi interface) to communicate with the host controller 110 and other devices over the in-home LAN 150. Still other devices may only have ports or transceivers for wired or point-to-point wireless communication (e.g., RS-232 ports, infrared (IR) transceivers, relay control ports, general-purpose input/output (GPIO) ports, etc.) and communicate with the host controller 110 and other devices using such ports. Further, some devices may include a LAN interface (e.g., a Wi-Fi interface), but not be configured to communicate with the host controller 110 directly over the in-home LAN 150, but instead communicate first with cloud services 180 via the Internet 170 and third party infrastructure 190. It should be understood that while HVAC devices 122 are shown in FIG. 1 as an example of one type of device that may communicate in this manner, other types of devices 112-122 may alternatively use this method of communication, and vice versa.

The communication may be used, among other things, to implement services selected by a user in a home automation control UI provided by the remote control 124. In addition, the user may control the home automation system using a mobile device 160. The mobile device 160 may include hardware components such as a processor, a memory, a storage device, a display screen (e.g., a touch sensitive display), a LAN interface (e.g., a Wi-Fi interface), a WPAN interface (e.g., a BLE interface), as well as other hardware components. The mobile device may execute a mobile app 162 configured to interface with the host controller 110 and/or cloud services 180, which may provide to the user another home automation control UI, similar to what is provided on the remote control 124, or including extended functionality. The mobile app 162 may further provide a provisioning and configuration UI that may be used as part of implementing the described provisioning and configuration techniques.

The host device 110 and mobile device 160 may communicate via the internet 170 with cloud services 180 and its host application program interfaces (APIs) 182 and mobile APIs 184. Cloud services 180 may provide remote access to home automation control, a persistent backup of the home database 130 (storing data in a configuration database 186), interfaces to third party infrastructure (via third party adaptors 188), user profile maintenance and usage tracking (storing data in user database 189), a mechanism for over-the-air updates, host crash reporting, and license management, among other functions.

Wireless Provisioning and Onboarding

The host software 111 on the host controller 110 and the mobile app 162 on the mobile device 160 may interoperate to utilize a combination of a WPAN (e.g., BLE) and the in-home LAN (e.g., Wi-Fi network) 150 to provision and configure the host controller 110 and devices 112-124 (collectively, "hardware elements") as part of initial installation of the home automation system, or as part of an update, or self heal, of the home automation system. The host controller 110 may later utilize the in-home LAN (e.g., Wi-Fi network) 150 to send control messages to devices, under the direction of the mobile app 162, to further setup, use or maintain the devices 112-124.

Figure 2:
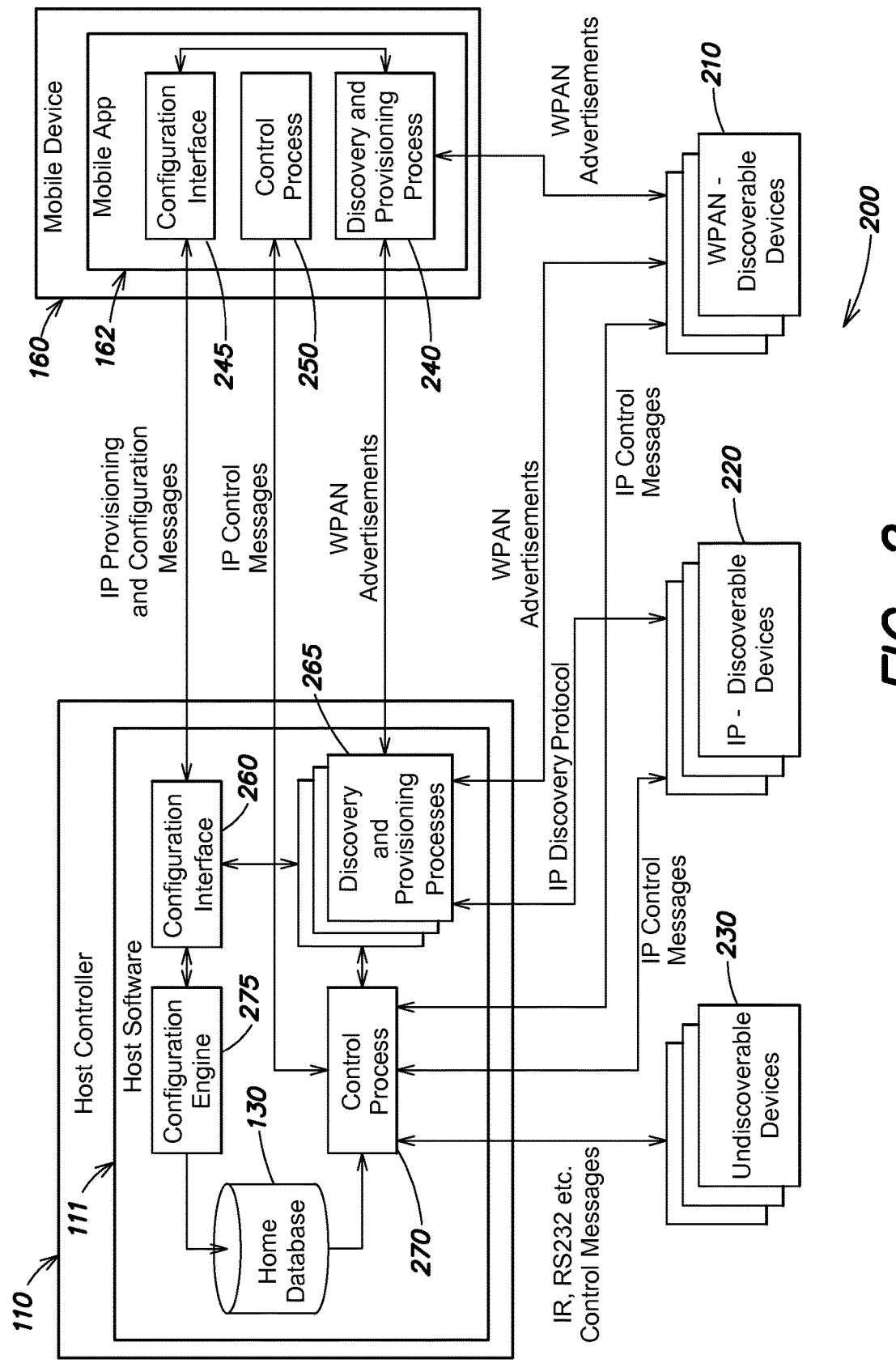
FIG. 2 is a block diagram illustrating interactions among host software on a host controller, a mobile app on a mobile device and devices of the home automation system.

FIG. 2 is a block diagram illustrating interactions among the host software 111 on the host controller 110, the mobile app 162 on the mobile device 160 and devices 112-124 of the home automation system. Certain entities (e.g., cloud services 180, Internet 170, etc.) are omitted from FIG. 2 to focus upon aspects of provisioning and configuration.

The devices 112-124 of the home automation system may be categorized depending upon their discovery capabilities. Devices that utilize a WPAN (e.g., BLE) to advertise their presence to other devices, the host controller 110, and/or the mobile device 160 may be considered WPAN-discoverable (e.g., Bluetooth-discoverable) devices 210. It should be understood that the host controller 110 itself may utilize a WPAN (e.g., BLE) to advertise its presence and thereby may be considered a WPAN-discoverable host controller (the WPAN-discoverable devices 210 and the WPAN-discoverable host controller collectively being "WPAN-discoverable hardware elements").

Devices that are incapable of communication over a WPAN (e.g., BLE) or otherwise configured not to utilize a WPAN to advertise their presence, but that utilize the in-home LAN 150 (e.g., Wi-Fi network) to advertise their presence, may be considered Internet Protocol (IP)-discoverable devices 220. It should be understood that other controllers (not shown) may be incapable of communication over a WPAN, or otherwise configured not to utilize a WPAN to advertise their presence, but may utilize the in-home LAN 150 to advertise their presence and thereby may be considered a IP-discoverable controllers (the IP-discoverable devices 220 and the IP-discoverable controllers collectively being "IP-discoverable hardware elements").

Still further, devices that are incapable of communication over a WPAN (e.g., BLE) and the in-home LAN (e.g., Wi-Fi network) 150, or otherwise configured not to utilize a WPAN or in-home LAN 150 to advertise their presence, may be considered undiscoverable devices 230.

The mobile app 162 may include a discovery and provisioning process 240 configured to scan on a WPAN to discover the host controller 110 initially, and then WPAN-discoverable devices 210, by monitoring for advertisements (e.g., BLE advertisements). The configuration interface 245 of the mobile app 162 may operate in conjunction with a provisioning and configuration UI provided by the mobile app 162 to initially receive user-provided network credentials, and transfer these user-provided network credentials to the host controller 110 to provision the host controller, and to be maintained in a local storage device of the host controller 110. Thereafter, notice regarding discovered devices may be provided to a configuration interface 260 on the host controller 110, by sending IP messages containing provision and configuration information over the in-home LAN 150. The configuration interface 245 of the mobile app 162 may later, in some situations, request network credentials from the host controller 110 for provisioning devices. Further, a user may onboard devices using the provisioning and configuration UI provided by the mobile app 162. The configuration interface 245 of the mobile app 162 may receive user-provided configuration information from the provisioning and configuration UI (e.g., a room with which a device is associated or one or more interconnections to other device), and convey this information to the configuration interface 260 on the host controller 110.

The host controller 110 may include a discovery and provisioning processes 265 configured to scan on a WPAN for WPAN-discoverable devices 210, by monitoring for advertisements (e.g., BLE advertisements), and to scan on the in-home LAN (e.g., using an IP discovery protocol) for IP-discoverable devices 220. Information about discovered devices may be conveyed to the configuration interface 260, as well as to a control process 270 of the host controller 110. The configuration interface 260 may retrieve network credentials from the host controller's local storage device, to be transferred to the discovered devices to provision them. Configuration information for devices received from the mobile app 162 may be passed to the configuration engine 275 as part of onboarding the devices. The configuration engine 275 may use the configuration information to generate or update a system configuration, to enable the devices to be used in providing one or more services in the home automation system, as discussed in more detail below. The system configuration may be stored in the home database 130.

Once devices are provisioned and configured, the home automation system may be actively used. A user may use a home automation control UI provided by the mobile app 162 that works in conjunction with a control process 250 of the mobile app 162. User input may be processed by the control process 250 into IP control messages that are sent over the in-home LAN 150 to a control process 270 of the host controller 110. The control process 270 may, thereafter, issue appropriate control commands in IP control messages over the in-home LAN 150 to devices that are connected in-home LAN, and as in IR, RS232 or other types of control messages to devices that lack such connectivity. In similar manner, the user may use a UI provided by a remote control 124 to cause the issue of control messages to devices under control of the host controller 110.

Figure 3:
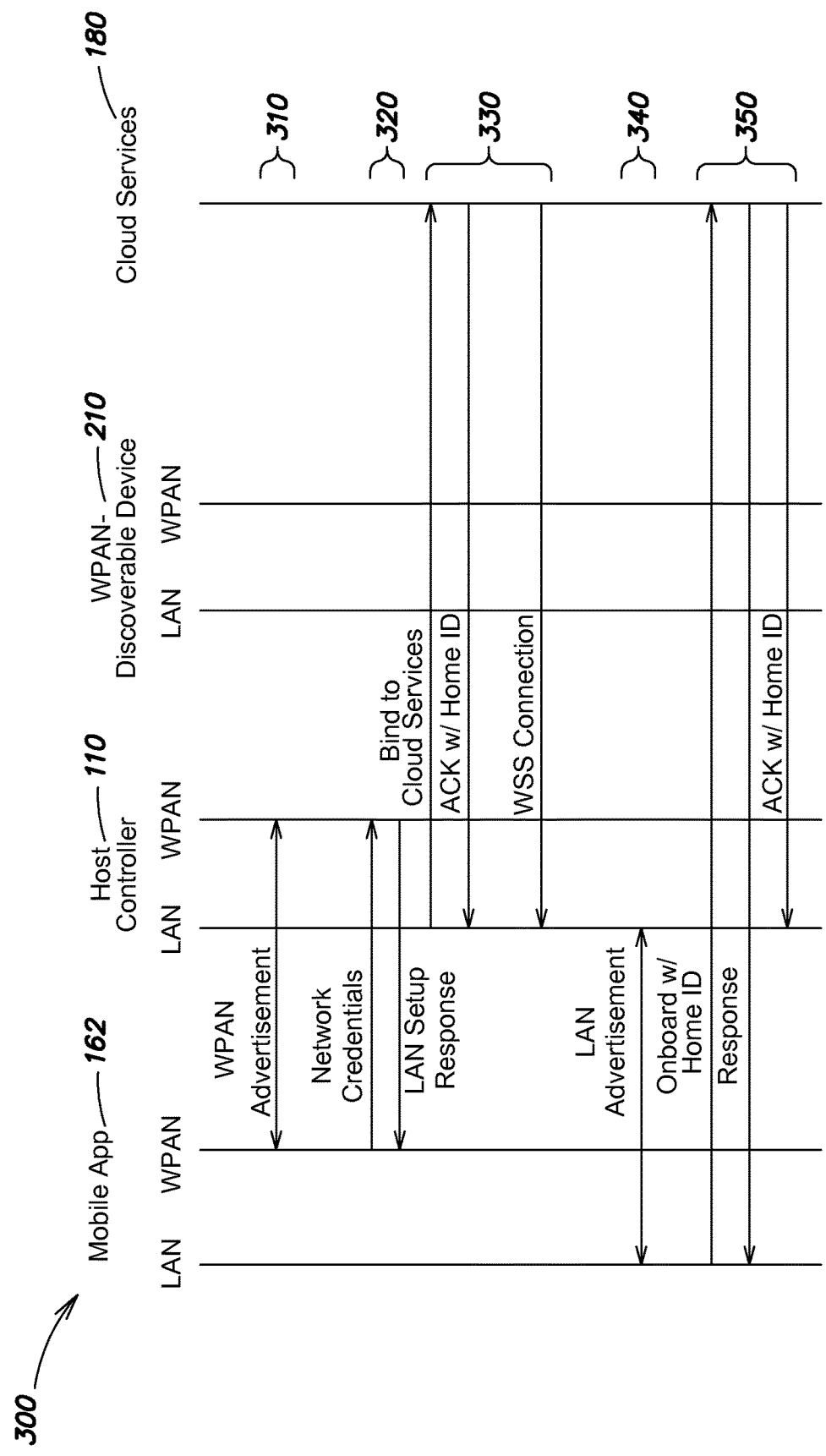
FIG. 3 is a messaging diagram showing greater detail of an example technique for provisioning and onboarding a host controller.

FIG. 3 is a messaging diagram 300 showing greater detail of an example technique for provisioning and onboarding a host controller 110. In this example, it is assumed that the host controller 110 has just been unboxed and turned on, however similar techniques may be used to update and/or self heal an existing host controller. It is further assumed in this example that the user has already used the mobile app 162 to create an account with cloud services 180.

At step 310, the host controller 110 advertises its presence on a WPAN (e.g., BLE) and is discovered by the mobile app 162 by exchanging advertisements (e.g., BLE advertisements) on the WPAN.

At step 320, the host controller 110 receives user-provided network credentials (e.g., Wi-Fi credentials such as SSID and password) for the in-home LAN (e.g., Wi-Fi network) from the mobile app 162 over the WPAN, and uses the network credentials to provision its interface to the in-home LAN. The host controller 110 also securely stores the network credentials for later use in provisioning other devices. The host controller 110 responds with a LAN setup response (e.g., a Wi-Fi setup response) confirming the host controller 110 is provisioned and network credentials are stored.

At step 330, the host controller 110 may report itself to cloud services 180 and open a connection (e.g., a websocket secure (WSS) connection) for bi-directional communication. As part of step 330, the host controller 110 may be assigned a unique home identifier (ID) that may be used in associating a home automation system and user with the host controller 110.

At step 340, the mobile app 162 scans on the in-home LAN for the host controller 110 and exchanges advertisements (e.g., Wi-Fi advertisements) on the in-home LAN to establish communications. At step 350, the mobile app 162 may associate a user with the host controller 162, using in part the home ID, by initiating an exchange with cloud services 180. The user is thereafter enabled to use the home automation control UI provided by the mobile app 162 to cause the host controller 110 to provide services. During such operations, each time the home database 130 of the host controller 110 is updated, any new information may be synchronized with the configuration database 186 maintained by cloud services 180.

Figure 4A:
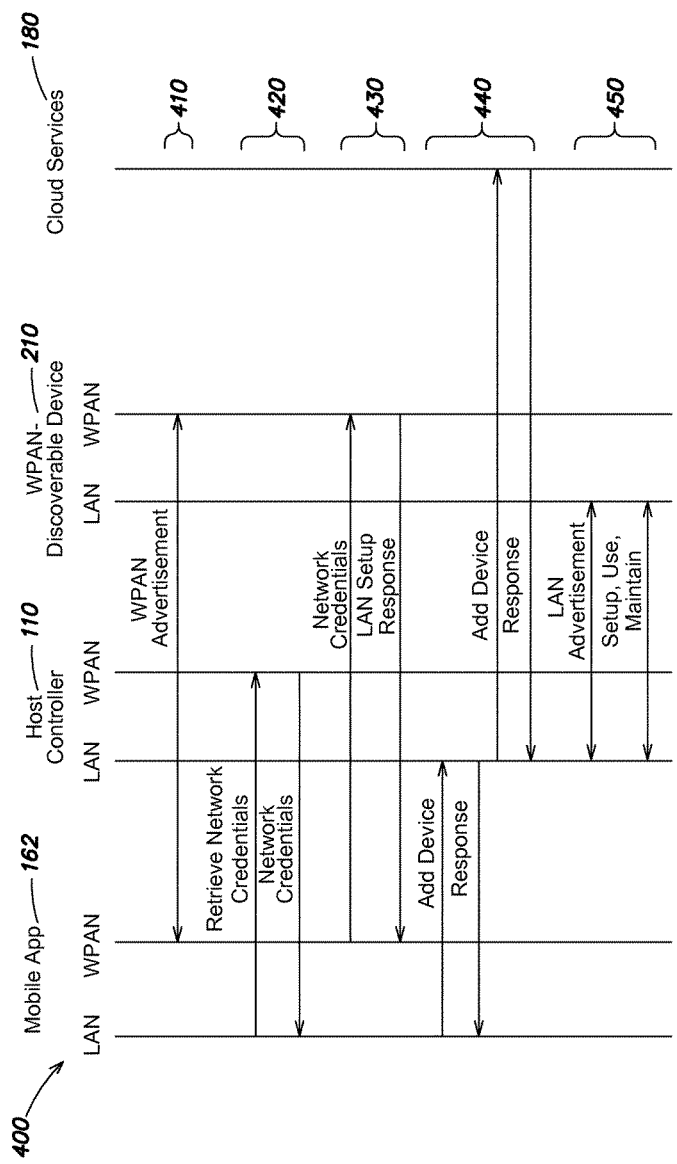
FIG. 4A is a messaging diagram showing greater detail of a first example technique for provisioning and onboarding a WPAN-discoverable device.

FIG. 4A is a messaging diagram 400 showing greater detail of a first example technique for provisioning and onboarding a WPAN-discoverable (e.g., Bluetooth-discoverable) device 210. In this example, it is assumed that the WPAN-discoverable device 210 has just been unboxed and turned on, however similar techniques may be used to update and/or self heal an existing device. The mobile app 162 should be brought to be within WPAN range (e.g., BLE range) of the WPAN-discoverable device 210, however the host controller 110 need not be in range for the type of provisioning and onboarding shown in FIG. 4A. The operations in FIG. 4A may occur immediately after the host controller 110 has been provisioned and onboarded, or at a later time.

At step 410, the WPAN-discoverable device 210 advertises its presence on a WPAN (e.g., BLE) and is discovered by the mobile app 162 by exchanging advertisements (e.g., BLE advertisements) on the WPAN.

At step 420, mobile app 162 receives input from a user indicating the WPAN-discoverable device 210 is to be added to the home automation system, along with user-provided configuration information (e.g., a room with which the device is associated and/or one or more interconnections of the device). Such information may be received in the provisioning and configuration UI of the mobile app 162. Upon receipt of such information, the mobile app 162 may retrieve network credentials (e.g., Wi-Fi credentials such as SSID and password) for the in-home LAN (e.g., Wi-Fi network) 150 from the host controller 110 over the in-home LAN.

At step 430, the mobile app 162 may transfer the network credentials over the WPAN to the WPAN-discoverable device 210 to provision its interface to the in-home LAN.

At step 440, the mobile app 162 may transfer the configuration information for the WPAN-discoverable device 210 to the host controller 110 over the in-home LAN. The host controller 110 may add the configuration information for the WPAN-discoverable device 210 to the home database 130, and in response to such update to the home database 130, synchronize the new information with the configuration database 186 maintained by cloud services 180.

Thereafter, at step 450, the host controller 110 may exchange advertisements (e.g., Wi-Fi advertisements) on the in-home LAN 150 with the WPAN-discoverable device 210, to establish communications, and send control messages over the in-home LAN 150 to setup, use or maintain the WPAN-discoverable device 210 during ongoing operation of the home automation system.

Figure 4B:
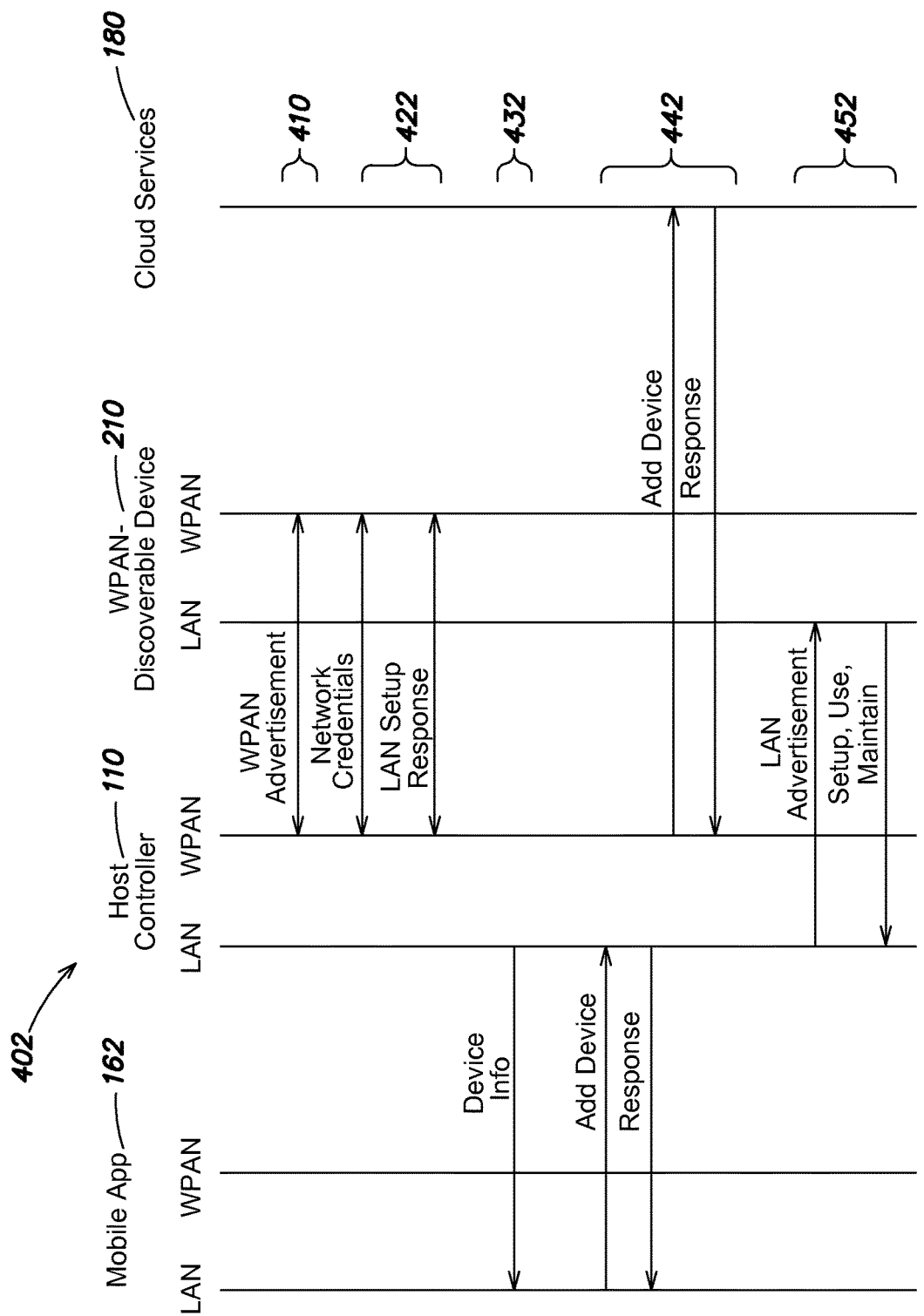
FIG. 4B is a messaging diagram showing greater detail of a second example technique for provisioning and onboarding a WPAN-discoverable device.

FIG. 4B is a messaging diagram 402 showing greater detail of a second example technique for provisioning and onboarding a WPAN-discoverable (e.g., Bluetooth-discoverable) device 210. In this example, it is assumed that the host controller 110 is within WPAN range (e.g., BLE range) of the WPAN-discoverable device 210. The operations in FIG. 4B may occur immediately after the host controller 110 has been provisioned and onboarded, or at a later time.

At step 412, the WPAN-discoverable device 210 advertises its presence on a WPAN (e.g., BLE) and is discovered by the hoist controller 110 by exchanging advertisements (e.g., BLE advertisements) on the WPAN.

At step 422, the host controller 110 transfers network credentials (e.g., Wi-Fi credentials such as SSID and password) for the in-home LAN over the WPAN to the WPAN-discoverable device 210 to provision it on the in-home LAN (e.g., Wi-Fi network) 150.

At step 432, the host controller 110 informs the mobile app 162 over the in-home LAN 150 of the existence of the WPAN-discoverable device 210. The mobile app 162 receives input from a user indicating the WPAN-discoverable device 210 is to be added to the home automation system, along with user-provided configuration information (e.g., a room with which the device is associated and/or one or more interconnections of the device). Such information may be received in the provisioning and configuration UI of the mobile app 162.

At step 442, the mobile app 162 may transfer the configuration information for the WPAN-discoverable device 210 to the host controller 110 over the in-home LAN 150. The host controller 110 may add the configuration information for the WPAN-discoverable device 210 to the home database 130, and, in response to such update to the home database 130, synchronize the new information with the configuration database 186 maintained by cloud services 180.

Thereafter, at step 452, the host controller 110 may exchange advertisements (e.g., Wi-Fi advertisements) on the in-home LAN 150 with the WPAN-discoverable device 210, to establish communications, and send control messages over the in-home LAN 150 to setup, use or maintain the WPAN-discoverable device 210 during ongoing operation of the home automation system.

Figure 4C:
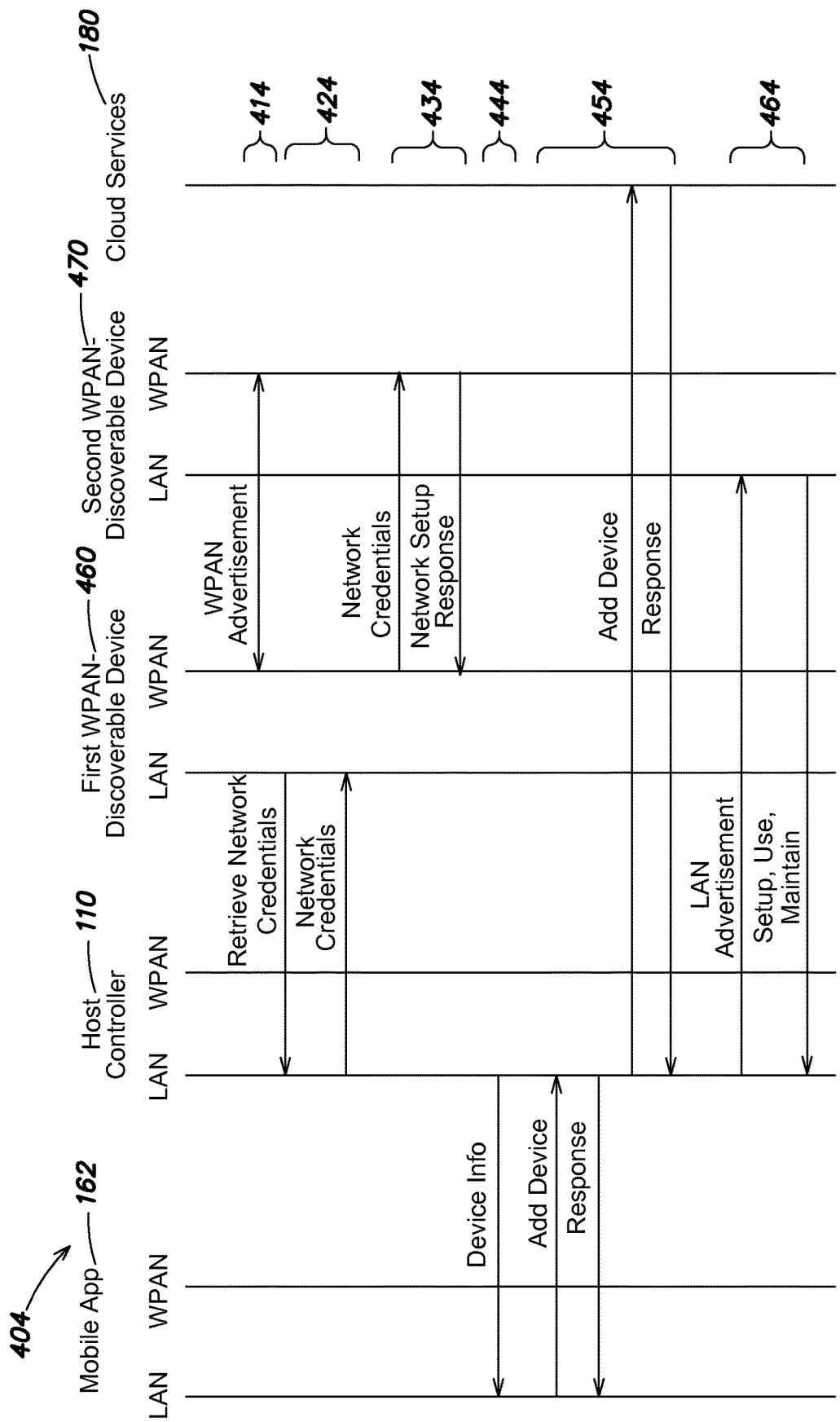
FIG. 4C is a messaging diagram 404 showing greater detail of a third example technique for provisioning and onboarding a WPAN-discoverable device.

FIG. 4C is a messaging diagram 404 showing greater detail of a third example technique for provisioning and onboarding a WPAN-discoverable device (e.g., Bluetooth-discoverable device). In this example, it is assumed that the host controller 110 is not within WPAN range (e.g., BLE range) of a second WPAN-discoverable device 470 that is to be provisioned and onboarded, but that a first WPAN-discoverable device 460 (that has already been provisioned and onboarded) is within WPAN range of the of a second WPAN-discoverable device. The operations in FIG. 4C may occur immediately after the first WPAN-discoverable device 460 has been provisioned and onboarded, or at a later time.

At step 414, the second WPAN-discoverable device 470 advertises its presence on a WPAN (e.g., BLE) and is discovered by the first WPAN-discoverable device 460 by exchanging advertisements (e.g., BLE advertisements).

At step 424, the first WPAN-discoverable device 460 retrieves network credentials (e.g., Wi-Fi credentials such as SSID and password) for the in-home LAN (e.g., Wi-Fi network) 150 from the host controller 110 over the in-home LAN 150.

At step 434, the first WPAN-discoverable device 460 transfers the network credentials for the in-home LAN over the in-home LAN to the second WPAN-discoverable device 470 to provision its interface to the in-home LAN 150.

At step 444 the host controller informs the mobile app 162 over the in-home LAN 150 of the existence of the second WPAN-discoverable device 470. The mobile app 162 receives input from a user indicating the second WPAN-discoverable device 210 is to be added to the home automation system, along with user-provided configuration information (e.g., a room with which the device is associated and/or one or more interconnections of the device). Such information may be received in the provisioning and configuration UI of the mobile app 162.

At step 454, the mobile app 162 may transfer the configuration information for the second WPAN-discoverable device 470 to the host controller 110 over the in-home LAN. The host controller 110 may add the configuration information for the second WPAN-discoverable device 470 to the home database 130, and, in response to such update to the home database 130, synchronize the new information with the configuration database 186 maintained by cloud services 180.

Thereafter, at step 464, the host controller 110 may exchange advertisements (e.g., Wi-Fi advertisements) on the in-home LAN 150 with the second WPAN-discoverable device 470, to establish communications, and send control messages over the in-home LAN 150 to setup, use or maintain the second WPAN-discoverable device 470 during ongoing operation of the home automation system.

Figure 5:
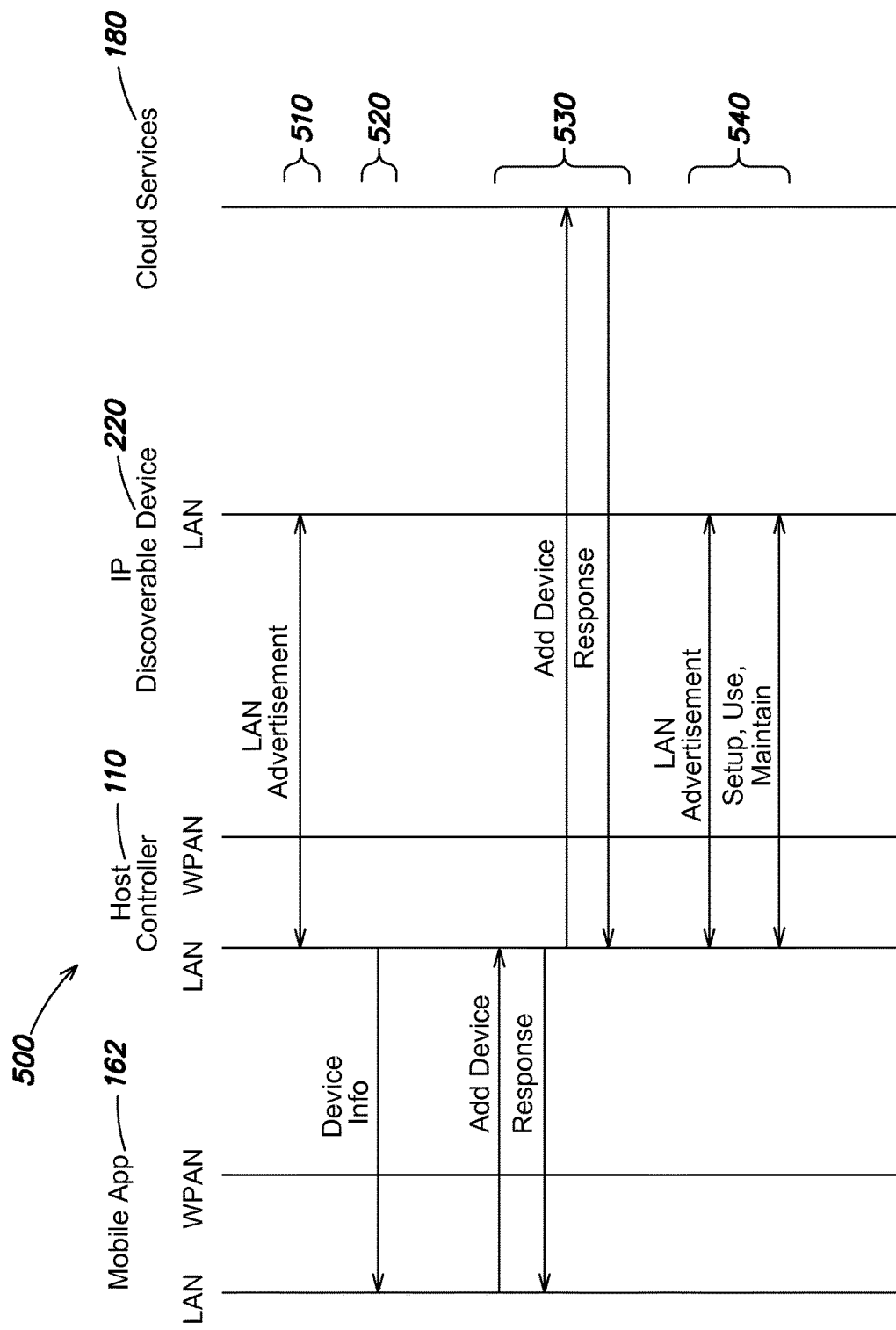
FIG. 5 is a messaging diagram showing greater detail of an example technique for provisioning and onboarding an IP-discoverable device.

FIG. 5 is a messaging diagram 500 showing greater detail of an example technique for provisioning and onboarding an IP-discoverable device 220. In this example, it is assumed that the IP-discoverable device 220 has just been unboxed and turned on, however similar techniques may be used to update and/or self heal an existing device. The operations in FIG. 5 may occur immediately after the host controller has been provisioned and onboarded, or at a later time.

At step 510, the host controller 110 scans on the in-home LAN (e.g., Wi-Fi network) 150 for the IP-discoverable device 220 (e.g., using an IP discovery protocol such as Simple Service Discovery Protocol (SSDP)) and exchanges advertisements (e.g., Wi-Fi advertisements) on the in-home LAN to establish communications.

At step 520, the host controller 110 reports the existence of the IP-discoverable device 220 to the mobile app 162, which may inform the user.

At step 530, the mobile app 162 receives input from the user indicating the IP-discoverable device 220 is to be added to the home automation system, along with user-provided configuration information (e.g., a room with which the device is associated and/or one or more interconnections of the device). Such information may be received in the provisioning and configuration UI of the mobile app 162. Upon receipt of such information, the mobile app 162 may transfer the configuration information to the host controller 110 over the in-home LAN 150. The host controller 110 may add the configuration information to the home database 130, and in response to such update to the home database 130, synchronize the new information with the configuration database 186 maintained by cloud services 180.

Thereafter, at step 540, the host controller 110 may exchange advertisements (e.g., Wi-Fi advertisements) on the in-home LAN 150 with the IP-discoverable device 220 to establish communications, and send control messages over the in-home LAN 150 to setup, use or maintain the IP-discoverable device 220 during ongoing operation of the home automation system.

Figure 6:
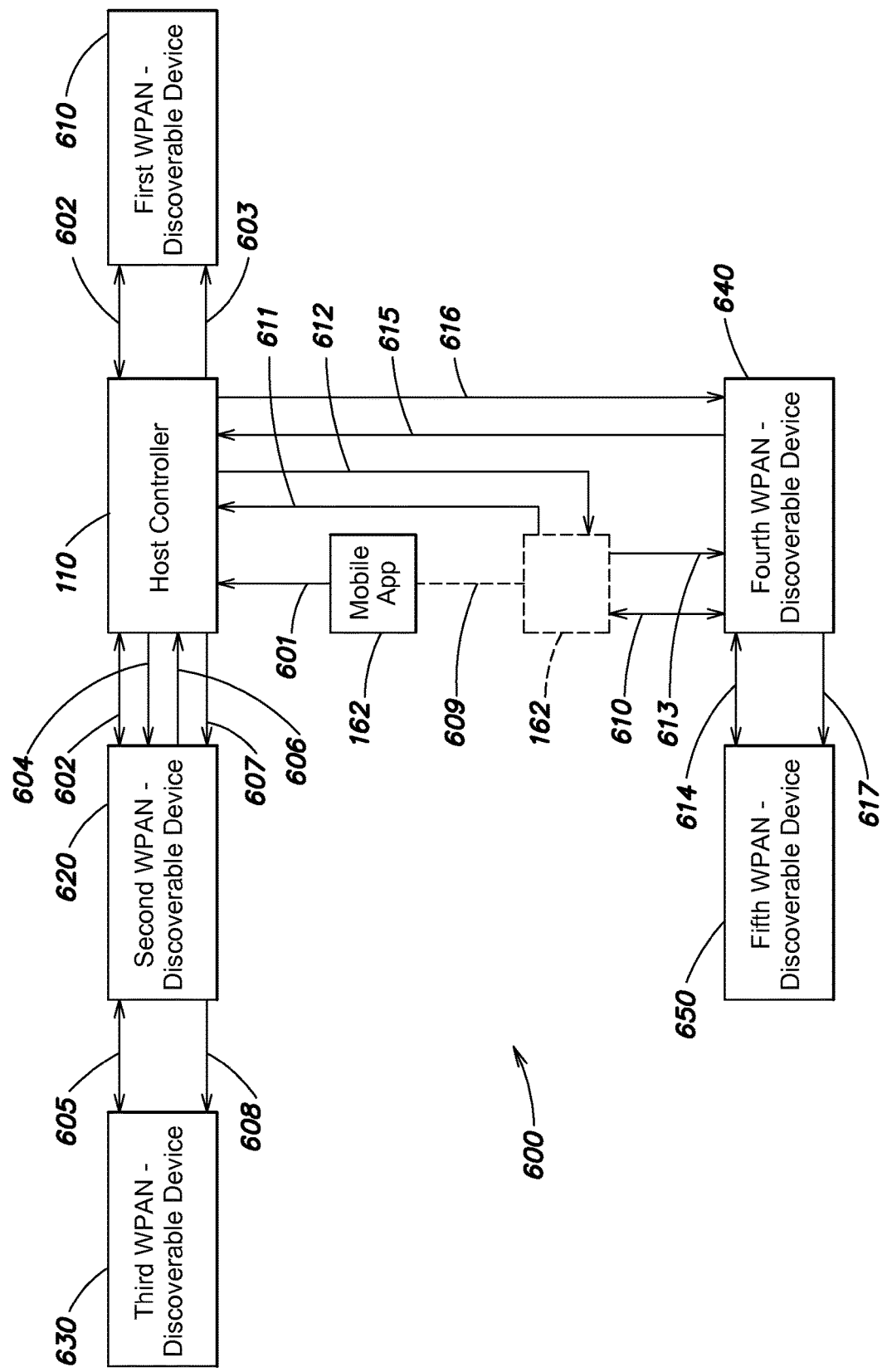
FIG. 6 is a diagram of an example home automation system depicting an example of how the techniques discussed in reference to FIGS. 3-5 may be utilized together to provision a host controller and WPAN-discoverable devices, some of which are in WPAN range and some of which are out of range.

FIG. 6 is a diagram of an example home automation system 600 depicting an example of how the techniques discussed in reference to FIGS. 3-5 may be utilized together to provision a host controller 110 and WPAN-discoverable devices 610-650, some of which are in WPAN (e.g., BLE) range and some of which are out of range. Certain advertisements and messages have been abstracted in FIG. 6 so the overall flow of operations may be more clearly seen.

At step 601, the mobile app 162 provisions a host controller 110 over a WPAN (e.g., BLE). At step 602, the host controller 110 discovers a first WPAN-discoverable device 610 and a second WPAN-discoverable device 620 that are within WPAN range (e.g., BLE range) of the host controller 110. At step 603, the host controller 110 provisions the first WPAN-discoverable device 610 over a WPAN, and, at step 604, provisions the second WPAN-discoverable device 620 over a WPAN. At step 605, during a periodic WPAN scan, the second WPAN-discoverable device 620 discovers a third WPAN-discoverable device 630 that is out of WPAN range from the host controller 110 (and may also be out of range of the mobile app 162). At step 606, the second WPAN-discoverable device 620 requests network credentials from the host controller 110 over the in-home LAN 150, and, at step 607, the host controller 110 responds over the in-home LAN 150 with the network credentials. At step 608, the second WPAN-discoverable device 620 provisions the third WPAN-discoverable device 630 over a WPAN.

The user may notice that a fourth WPAN-discoverable device 640 and a fifth WPAN-discoverable device 650 are not provisioned. The fourth WPAN-discoverable device 640 and the fifth WPAN-discoverable device 650 may be beyond WPAN range (e.g., BLE range) of the host controller 110, the already provisioned WPAN-discoverable devices 610-630 and the mobile app 162 (when the mobile device 160 is disposed at its original location). At step 609, the user physical moves the mobile app 162 (more specifically, the mobile device 160 executing the mobile app 162), so that the mobile app 162 is within WPAN range of the fourth WPAN-discoverable device 640. At step 610, the mobile app 162 discovers the fourth WPAN-discoverable device 640 using a WPAN. At step 611, the mobile app 162 requests network credentials from the host controller 110 over the in-home LAN 150, and, at step 612, the host controller 110 responds over the in-home LAN 150 with the network credentials. At step 613, the mobile app 162 provisions the fourth WPAN-discoverable device 640 over a WPAN.

At step 614, during a periodic WPAN scan, the fourth WPAN-discoverable device 640 discovers the fifth WPAN-discoverable device 650 that is out of WPAN range from the host controller 110 and mobile app 162. At step 615, the fourth WPAN-discoverable device 640 requests network credentials from the host controller 110 over the in-home LAN 150, and, at step 616, the host controller 110 responds over the in-home LAN 150 with the network credentials. At step 617, the fourth WPAN-discoverable device 640 provisions the fifth WPAN-discoverable device 650 over a WPAN.

As can be seen from the example sequence of operations in FIG. 6, provisioning may cascade among devices, to cover devices that are not within WPAN range of the host controller 110 (or even the mobile app 162), until all devices of the home automation system are provisioned to use the in-home LAN.

Figure 7:
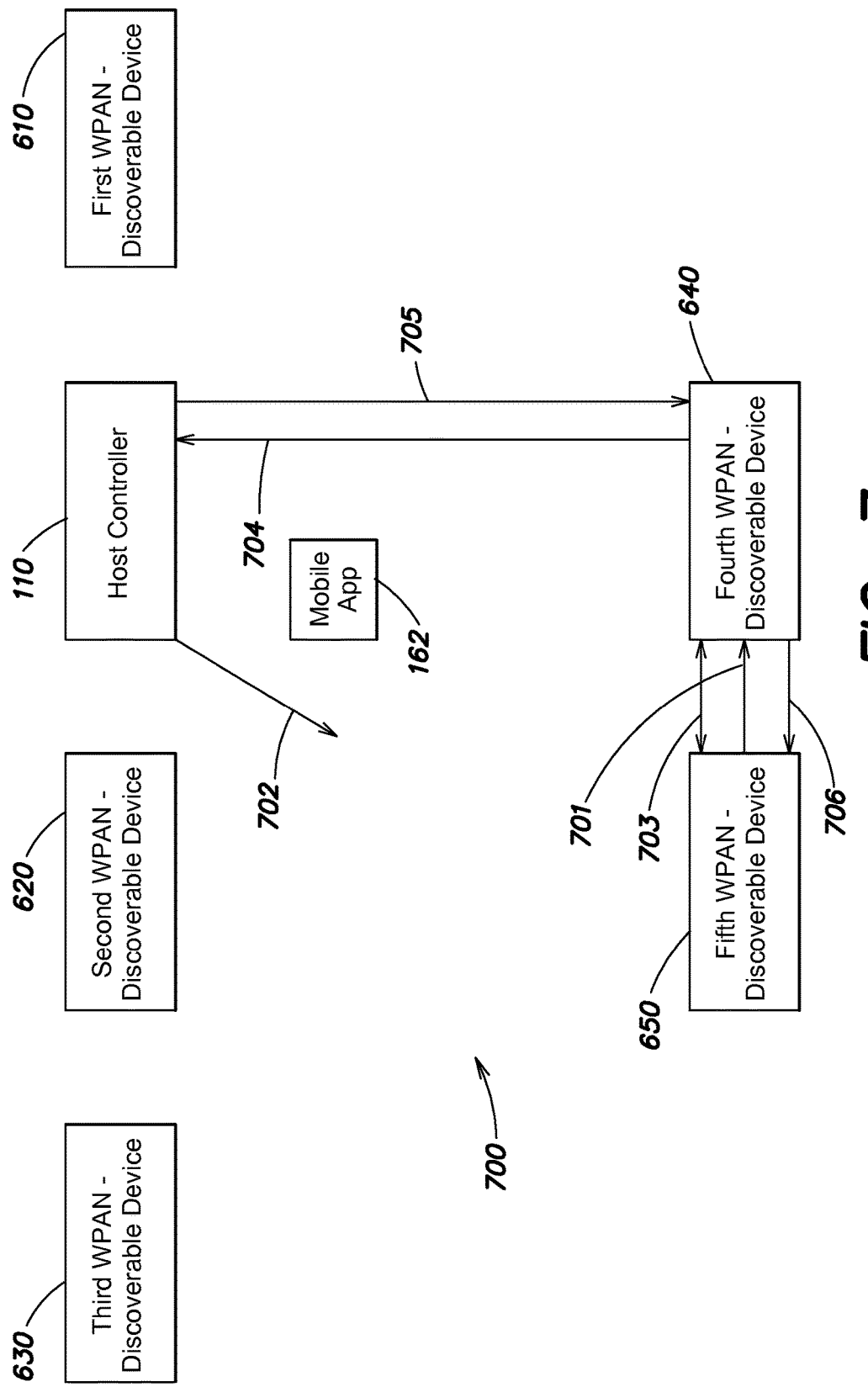
FIG. 7 is a diagram of an example home automation system providing an example of how the techniques discussed in reference to FIGS. 3-5 may be utilized together to self-heal a device that originally was accessible on an in-home LAN, but has been reset to lose its network credentials.

FIG. 7 is a diagram of an example home automation system 700 providing an example of how the techniques discussed in reference to FIGS. 3-5 may be utilized together to self-heal a device that originally was accessible on an in-home LAN (e.g., Wi-Fi network) 150, but has been reset (e.g., factory reset) to lose its network credentials (e.g., in response to corruption of data, a software "lock up", or other error). Assume that the fifth WPAN-discoverable device 650 has been reset such that it has lost its network credentials. At step 701, the fifth WPAN-discoverable device 650 sends advertisements on a WPAN (e.g., BLE) indicating that it requires provision. At step 702, the host controller 110 detects that the fifth WPAN-discoverable device 650 is no longer accessible on the in-home LAN (e.g., Wi-Fi network) 150 and tries to discover the device upon a WPAN, but fails since the device is beyond WPAN range (e.g., BLE range) of the host controller 110. At step 703, during a periodic WPAN scan, the fourth WPAN-discoverable device 640 discovers the fifth WPAN-discoverable device 650, receiving the advertisements and responding back. At step 704, the fourth WPAN-discoverable device 640 requests network credentials from the host controller 110 over the in-home LAN 150, and, at step 705, the host controller 110 responds over the in-home LAN 150 with the network credentials. At step 706, the fourth WPAN-discoverable device 640 provisions the fifth WPAN-discoverable device 650 over a WPAN. The fifth WPAN-discoverable device 650 may use the network credentials to rejoin the in-home LAN 150 and again communicate with the host controller 110.

Figure 8A:
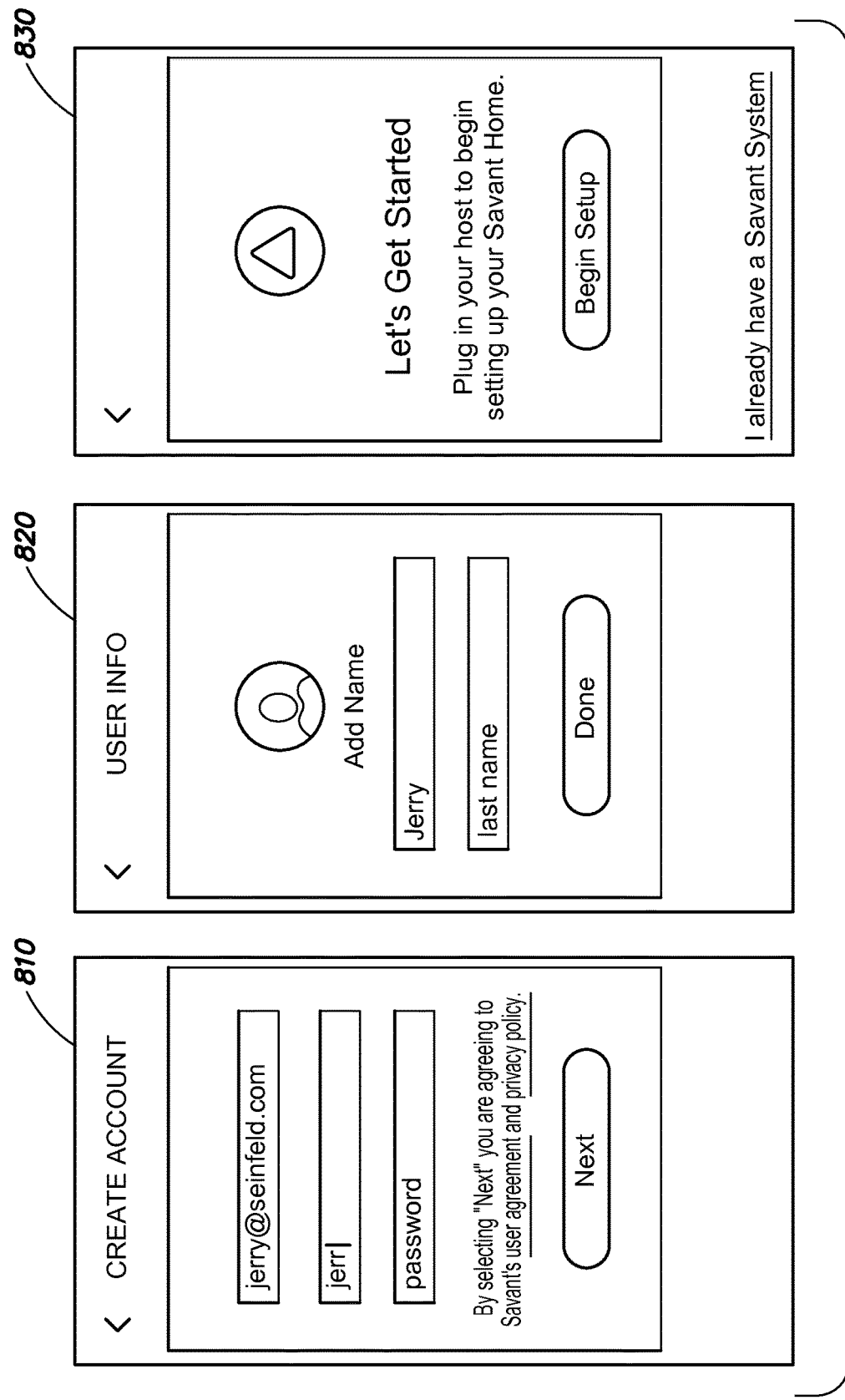
Figure 8B:
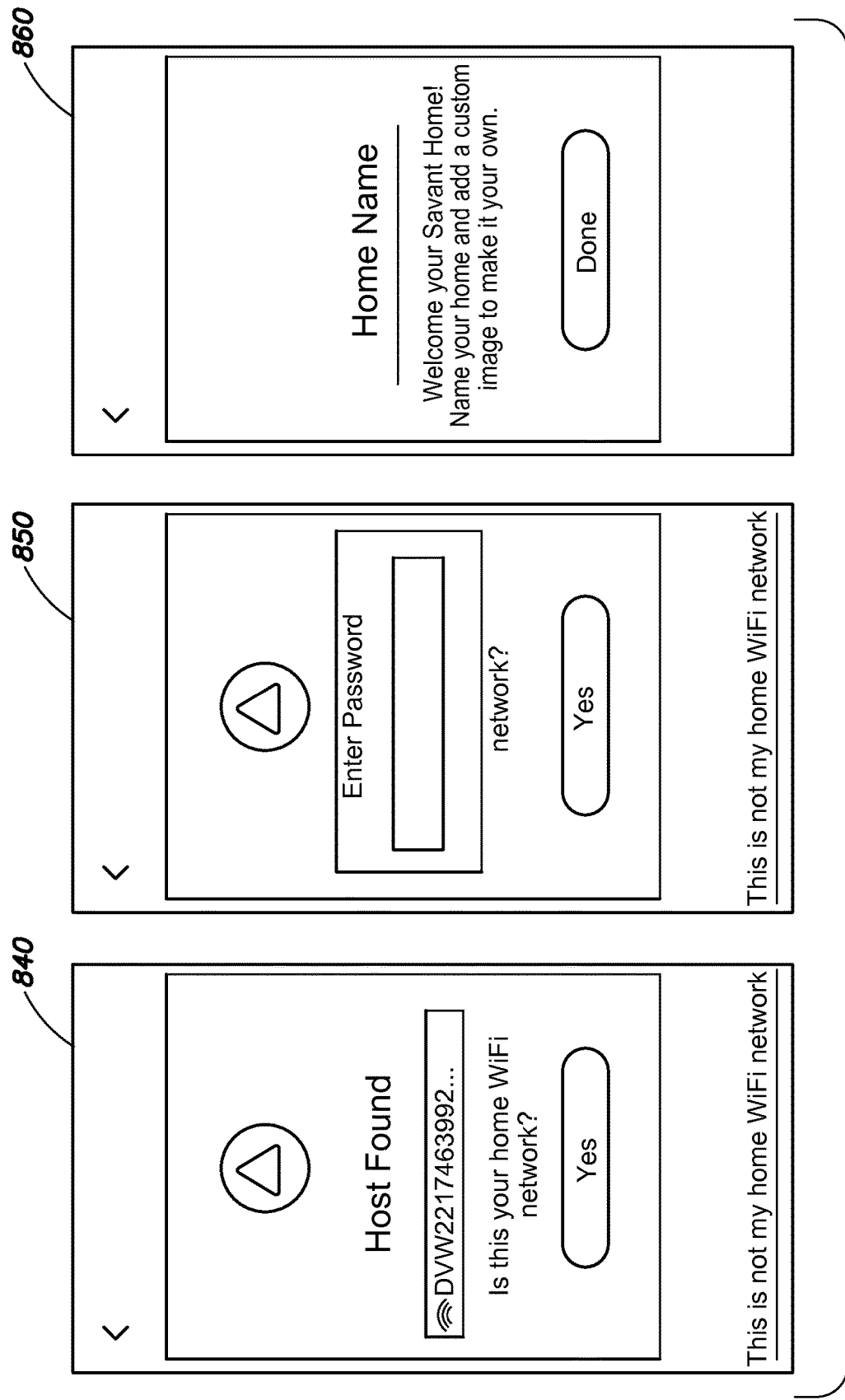

FIGS. 8A-8C are a series of example screen shots 810-880 of a provisioning and configuration UI of the mobile app 162 that may be shown on a display screen of a mobile device 160. It should be understood that the screen shots 810-880 may only represent certain illustrative operations of the provisioning and configuration UI, and that a wide variety of other screens may be shown to cover various different situations that may be encountered when provisioning and onboarding devices of a home automation system. In screen 810, a user may create an account with cloud services 180, and then, in screen 820, login to that account. In screen 830, the user may be prompted to begin provisioning and onboarding with a host controller 110, being asked to plug in the host controller and move within WPAN (e.g., BLE) range. In screen 840, the user may be notified that the host controller 110 has been successfully discovered on a WPAN. Further, the mobile app 162 may auto discover at least a first network credential (e.g., a SSID) for a detected in-home LAN (e.g., Wi-Fi network) 150 and prompt the user to confirm it is correct. In screen 850, the user may be prompted to provide a second network credential (e.g., a password) for the detected in-home LAN 150. In screen 860, the user may be prompted to provide a home name. The host controller 110 may then be provisioned. In screen 870, the user may be notified that the mobile app 162 and/or the host controller 110 are scanning for devices. These devices, upon detection may be provisioned as well. In screen 880, for a detected device, the user may be prompted to provide configuration information (e.g., a room with which the device is associated, one or more interconnections of the device, etc.) to onboard the device. The provided configuration information may be passed to the host controller 110, to be processed by the configuration engine 275 and added to the home database 130.

Generating a System Configuration

Referring back to FIG. 2, when the host controller 110 receives configuration information for a device being onboarded, the configuration information may be passed by the configuration interface 260 to the configuration engine 275 that generates or updates a system configuration stored in the home database 130 that enables the devices to be used in providing one or more services in the home automation system.

Figure 9:
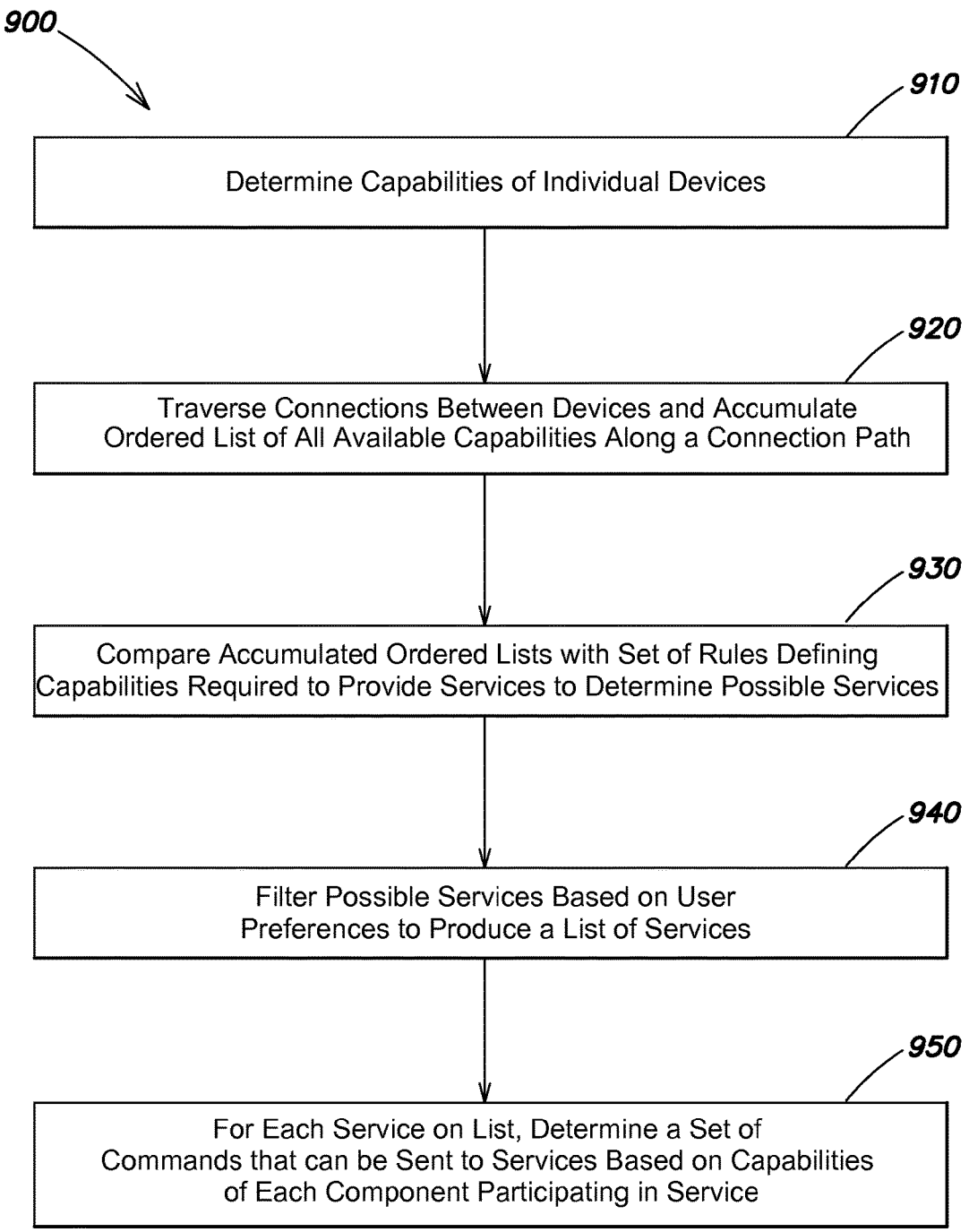
FIG. 9 is a flow diagram of an example sequence of step that may be executed by a configuration engine to configure a home automation system to provide services.

FIG. 9 is a flow diagram of an example sequence of step 900 that may be executed by the configuration engine 275 to configure a home automation system to provide services. At step 910, upon the receipt of configuration information for devices of the home automation system, the configuration engine 275 may determine capabilities of each individual device (e.g., by reference to a device profile for that type of device). At step 920, based on indications of interconnections between devices, the configuration engine 275 may accumulate an ordered list of all available capabilities along a connection path through the home automation system. At step 930, the configuration engine 275 may compare accumulated ordered lists with a set of rules defining capabilities required to provide services, and based on matches, determine a list of possible services that can be provided by the home automation system. At step 940, the configuration engine 275 may filter the list of possible services based on user preferences (e.g., provided by a user into the provisioning and configuration UI of the mobile app 162), to produce a list of services. Then, at step 950, for each service on the list, the configuration engine 275 may determine a set of commands that can be sent to the services based on capabilities of each component. The list of services and the list of commands may be stored (along with the configuration information itself) in the home database 130. During ongoing operation of the home automation system, this information may be used by the control process 270 to generate appropriate IP control messages (and other types of control messages, such as IR, RS232, etc.) to control services, and to generate appropriate UI elements of a control UI that may be displayed on the mobile device 162 and used by the user to control the services.

Conclusion

It should be understood that various adaptations and modifications may be made to the above provided disclosure. While the embodiments discussed above may involve a home automation system that includes a variety of different types of devices, such as lighting devices, security devices, A/V devices, electronic door locks, HVAC devices, etc., it should be understood that the present techniques may be adapted for use with more limited types of home automation systems. For example, the techniques may be used with a home automation system that provides only lighting control (i.e. a lighting control system), a home automation system that provides only A/V control (i.e., an A/V control system), or another type of more limited home automation system.

Further, while the embodiments discussed above suggest various software processes may execute on particular devices (such as, on the host controller 110, remote control 124 or mobile device 160, etc.), it should be understood that software processes may be executed on different hardware devices, including on cloud-based hardware as part of cloud services 180. In particular, while it is discussed above that the mobile app 162 may be executed on the mobile device 160, it should be understood that the mobile app may also be executed on certain remote controls 124, or other portable electronic devices.

Still further, while BLE is discussed above as an example of a WPAN, it should be understood that a wide variety of other network types running various protocols may be used may be used in place of BLE or in conjunction with BLE for the WPAN, including, for example, classic Bluetooth, wireless universal serial bus (USB), INSTEAON, Z-Wave, ZigBee, etc.

Likewise, while a Wi-Fi network is discussed above as an example of an in-home LAN 150, it should be understood that a wide variety of other network types running various protocols may be used in place of Wi-Fi or in conjunction with Wi-Fi for the in-home LAN, including, for example, wired Ethernet.

Further, it should be understood that at least some of the functionality suggested above to be implemented in software may be implemented in hardware. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile or persistent memory, a hard-disk, a compact disk (CD), or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components, for example, processors, memories, etc. Above all, it should be understood that the above embodiments are meant to be taken only by way of example.

What is claimed is:

1. A method for provisioning and/or configuring hardware elements of a home automation system, comprising:
   advertising presence on a WPAN, by a first wireless personal area network (WPAN)-discoverable hardware element of the home automation system that is not accessible on an in-home local area network (LAN) used by the home automation system, to enable the first WPAN-discoverable hardware element to be discovered by a mobile application (app);
   receiving, at the first WPAN-discoverable hardware element over the WPAN, user-provided network credentials from the mobile app;

configuring the first WPAN-discoverable hardware element on the in-home LAN using the network credentials;

storing the network credentials in a storage device of the first WPAN-discoverable hardware element; and provisioning a second WPAN-discoverable hardware element of the home automation system by transferring the network credentials from the first WPAN-discoverable hardware element back to the mobile app via the in-home LAN, and causing the mobile app to forward the network credentials via the WPAN to the second WPAN-discoverable hardware element.

2. The method of claim 1, wherein the first WPAN-discoverable hardware element is a host controller of the home automation system and the second WPAN-discoverable hardware element is a lighting device, audio/video (A/V) device, security device, heating ventilation and cooling (HVAC) device, or electronic door lock under control of the host controller.

3. The method of claim 1, wherein the WPAN is Bluetooth low energy (BLE), the in-home LAN is a Wi-Fi network and the network credentials include a Service Set Identifier (SSID) or password for the Wi-Fi network.

4. The method of claim 1, further comprising:
receiving, at the first WPAN-discoverable hardware element, user-provided configuration information for the second WPAN-discoverable hardware element from the mobile app over the in-home LAN, wherein the configuration information includes at least one of a room with which the second WPAN-discoverable hardware element is associated or one or more interconnections of the second WPAN-discoverable hardware element to other hardware elements; and adding the configuration information for the second WPAN-discoverable hardware element to a home database maintained in the storage device of the first WPAN-discoverable hardware element.

5. The method of claim 4, further comprising:
synchronizing the in-home database with a configuration database of cloud services.

6. The method of claim 1, further comprising:
sending control messages from the first WPAN-discoverable hardware element over the in-home LAN to the second WPAN-discoverable hardware element to setup, use or maintain the second WPAN-discoverable hardware element.

7. The method of claim 1, further comprising:
scanning, by the first WPAN-discoverable hardware element, on the in-home LAN, to discover an internet protocol (IP)-discoverable hardware element.

8. The method of claim 7, further comprising:
receiving, at the first WPAN-discoverable hardware element, user-provided configuration information for the IP-discoverable hardware element from the mobile app over the in-home LAN, wherein the configuration information includes at least one of a room with which the IP-discoverable hardware element is associated or one or more interconnections of the IP-discoverable hardware element to other hardware elements; and adding the configuration information for the IP-discoverable hardware element to a home database maintained in the storage device of the first WPAN-discoverable hardware element.

9. The method of claim 8, further comprising:
synchronizing the in-home database with a configuration database of cloud services.

10. The method of claim 9, further comprising:
sending control messages from the first WPAN-discoverable hardware element over the in-home LAN to the IP-discoverable hardware element to setup, use or maintain the IP-discoverable hardware element.

11. A method for provisioning and/or configuring hardware elements of a home automation system, comprising:
scanning, by a first WPAN-discoverable hardware element of the home automation system, on a wireless personal area network (WPAN) to discover a second WPAN-discoverable hardware element of the home automation system that is not accessible on an in-home local area network (LAN) used by the home automation system;

retrieving, by the first WPAN-discoverable hardware element, network credentials for the in-home LAN from a storage device of the first WPAN-discoverable hardware element; and provisioning a second WPAN-discoverable hardware element by transferring the network credentials from the first WPAN-discoverable hardware element to the second WPAN-discoverable hardware element over the WPAN.

12. The method of claim 11, wherein the first WPAN-discoverable hardware element is a host controller of the home automation system and the second WPAN-discoverable hardware element is a lighting device, audio/video (A/V) device, security device, heating ventilation and cooling (HVAC) device, or electronic door lock under control of the host controller.

13. The method of claim 11, wherein the WPAN is Bluetooth low energy (BLE), the in-home LAN is a Wi-Fi network and the network credentials include a Service Set Identifier (SSID) or password for the Wi-Fi network.

14. The method of claim 11, wherein the second WPAN-discoverable hardware element is initially accessible on the in-home LAN, but is then reset to lose the network credentials, and the scanning, retrieving, and provisioning are performed as part of a self-healing operation to make the second WPAN-discoverable hardware element again accessible on the in-home LAN.

15. The method of claim 11, further comprising, prior to the scanning, retrieving and provisioning:
receiving, by the first WPAN-discoverable hardware element of the home automation system via the WPAN, network credentials from a mobile application (app);

configuring the first WPAN-discoverable hardware element on the in-home LAN using the network credentials; and storing the network credentials in the storage device of the first WPAN-discoverable hardware element.

16. The method of claim 11, further comprising:
scanning, by the first WPAN-discoverable hardware element, on the in-home LAN, to discover an internet protocol (IP)-discoverable hardware element;

receiving, at the first WPAN-discoverable hardware element, user-provided configuration information for the IP-discoverable hardware element from the mobile app over the in-home LAN, wherein the configuration information includes at least one of a room with which the IP-discoverable hardware element is associated or one or more interconnections of the IP-discoverable hardware element to other hardware elements; and adding configuration information for the IP-discoverable hardware element to a home database maintained in the storage device of the first WPAN-discoverable hardware element.

17. The method of claim 16, further comprising:
synchronizing the home database with a configuration database of cloud services.

18. The method of claim 11, further comprising:
sending control messages from the first WPAN-discoverable hardware element over the in-home LAN to the second WPAN-discoverable hardware element to setup, use or maintain the second WPAN-discoverable hardware element.

19. A method for provisioning and/or configuring hardware elements of a home automation system, comprising:
scanning, by a second WPAN-discoverable hardware element of the home automation system, on a wireless personal area network (WPAN) to discover a third WPAN-discoverable hardware element of the home automation system that is not accessible on an in-home local area network (LAN) used by the home automation system;
retrieving, by the second WPAN-discoverable hardware element over the in-home LAN, network credentials for the in-home LAN from a first WPAN-discoverable hardware element of the home automation system that maintains the credentials in a storage device; and
provisioning the third WPAN-discoverable hardware element by transferring the network credentials from the second WPAN-discoverable hardware element to the third WPAN-discoverable hardware element over the WPAN.

20. The method of claim 19, wherein the third WPAN-discoverable hardware element is out of WPAN range from the first WPAN-discoverable hardware element.

21. The method of claim 19, wherein the second WPAN-discoverable hardware element is a second lighting device, audio/video (A/V) device, security device, heating ventilation and cooling (HVAC) device, or electronic door lock and the third WPAN-discoverable hardware element is a third lighting device, A/V device, security device, HVAC device, or electronic door lock.

22. The method of claim 19, wherein the WPAN is Bluetooth low energy (BLE), the in-home LAN is a Wi-Fi network and the network credentials include a Service Set Identifier (SSID) or password for the Wi-Fi network.

23. The method of claim 19, wherein the third WPAN-discoverable hardware element is initially accessible on the in-home LAN, but is then reset to lose the network credentials, and the scanning, retrieving, and provisioning are performed as part of a self-healing operation to make the third WPAN-discoverable hardware element again accessible on the in-home LAN.

24. A method for provisioning and/or configuring hardware elements of a home automation system, comprising:
scanning, by a mobile application (app) executing on a mobile device or remote control on a wireless personal area network (WPAN), to discover a second WPAN-discoverable hardware element of the home automation system that is not accessible on an in-home local area network (LAN) used by the home automation system;
retrieving, by the mobile app over the in-home LAN, network credentials for the in-home LAN from a first WPAN-discoverable hardware element of the home automation system that maintains the network credentials in a storage device; and
provisioning the second WPAN-discoverable hardware element by transferring the network credentials from the mobile app to the second WPAN-discoverable hardware element over the WPAN.

25. The method of claim 24, wherein the second WPAN-discoverable hardware element is out of WPAN range from the first WPAN-discoverable hardware element.

26. The method of claim 24, wherein the second WPAN-discoverable hardware element is initially accessible on the in-home LAN, but is then reset to lose the network credentials, and the scanning, retrieving, and provisioning are performed as part of a self-healing operation to make the second WPAN-discoverable hardware element again accessible on the in-home LAN.

27. The method of claim 24, wherein the first WPAN-discoverable hardware element is a host controller of the home automation system, and the second WPAN-discoverable hardware element is a lighting device, audio/video (A/V) device, security device, heating ventilation and cooling (HVAC) device, or electronic door lock under control of the host controller.

28. The method of claim 24, wherein the WPAN is Bluetooth low energy (BLE), the in-home LAN is a Wi-Fi network and the network credentials include a Service Set Identifier (SSID) or password for the Wi-Fi network.

29. The method of claim 24, further comprising, prior to the scanning, retrieving and provisioning:
scanning, by the mobile app, on a wireless personal area network (WPAN) to discover the first WPAN-discoverable hardware element, while the first WPAN-discoverable hardware element is not accessible on the in-home LAN; and
provisioning the first WPAN-discoverable hardware element by transferring the network credentials from mobile app to the first WPAN-discoverable hardware element over the WPAN, the network credentials to be stored in the storage device of the first WPAN-discoverable hardware element.

30. The method of claim 24, further comprising:
providing, by the mobile app over the in-home LAN, user-provided configuration information for the second WPAN-discoverable hardware element to a home database maintained by the first WPAN-discoverable hardware element, wherein the configuration information includes at least one of a room with which the second WPAN-discoverable hardware element is associated or one or more interconnections of the second WPAN-discoverable hardware element to other hardware elements.

* * * * *